United States Patent
Papasakellariou et al.

(10) Patent No.: US 7,133,435 B2
(45) Date of Patent: Nov. 7, 2006

(54) INTERFERENCE CANCELLATION SYSTEM AND METHOD

(75) Inventors: Aris Papasakellariou, Dallas, TX (US); Anand Dabak, Plano, TX (US); Timothy Schmidl, Dallas, TX (US); Eko Onggosanusi, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 876 days.

(21) Appl. No.: 10/176,156

(22) Filed: Jun. 20, 2002

(65) Prior Publication Data

US 2003/0012264 A1 Jan. 16, 2003

Related U.S. Application Data

(60) Provisional application No. 60/299,649, filed on Jun. 20, 2001.

(51) Int. Cl.
*H04B 1/69* (2006.01)
*H04B 1/713* (2006.01)

(52) U.S. Cl. .................. 375/148; 375/149; 375/150; 714/786

(58) Field of Classification Search ........... 375/150, 375/148, 149, 144, 278, 284; 714/795, 786
See application file for complete search history.

(56) References Cited

U.S. PATENT DOCUMENTS

| | | | | |
|---|---|---|---|---|
| 5,521,937 | A * | 5/1996 | Kondo et al. ............ | 375/144 |
| 6,014,373 | A * | 1/2000 | Schilling et al. ........ | 370/342 |
| 2002/0024991 | A1* | 2/2002 | Levin et al. ............. | 375/148 |
| 2002/0067761 | A1* | 6/2002 | Kong et al. .............. | 375/148 |
| 2002/0141486 | A1* | 10/2002 | Bottomley et al. ...... | 375/148 |
| 2004/0131108 | A1* | 7/2004 | Kyosti ..................... | 375/148 |
| 2005/0013350 | A1* | 1/2005 | Coralli et al. ........... | 375/148 |

OTHER PUBLICATIONS

Ghassemzadeh, S.S et al, Multipath fading statistics of a direct sequence CDMA signal at 2 GHz, in microcellular and indoor environment, Military Communications Conference, MILCOM Conference Record, 1994 IEEE, vol. 2, Oct. 1994 pp. 604-607.*

* cited by examiner

*Primary Examiner*—Jean B. Corrielus
*Assistant Examiner*—Qutub Ghulamali
(74) *Attorney, Agent, or Firm*—Carlton H. Hoel; W. James Brady; Frederick J. Telecky, Jr.

(57) ABSTRACT

A method for reducing multiple access interference (MAI) in a code division multiple access (CDMA) spread spectrum receiver assigned a number of codes which also despreads the received signal with the remaining codes of the same spreading factor. For forward link transmission with orthogonal codes, as in 3GPP and 3GPP2, interferers using larger spreading factors than the one used by the referenced mobile will have codes that are formed from the orthogonal codes of the same spreading factor as the multicodes corresponding to the referenced mobile. As a consequence, in a multipath environment, the output of a despreader using any of these remaining orthogonal codes will provide an estimate of the composite interference attributed to signals, if any, using codes that partly comprise the corresponding orthogonal code. No decisions are made for the previous despreader's output because it corresponds to a sum of interferers with unknown powers. However, this soft output can be re-spread and subtracted from the received signal prior to despreading, thereby removing the corresponding composite interference. This can significantly improve the performance of a receiver performing interference cancellation of both assigned and interfering signals, especially when the interfering signals have a substantial total power.

23 Claims, 5 Drawing Sheets

INTERFERENCE CANCELLATION SYSTEM AND METHOD

CROSS-REFERENCE TO RELATED APPLICATIONS

This application claims priority from provisional applications: Ser. No. 60/299,649, filed Jun. 20, 2001.

BACKGROUND OF THE INVENTION

The invention relates to electronic devices, and more particularly to coding, transmission, storage, and decoding/synthesis methods and circuitry as is useful in spread spectrum systems.

Code division multiple access (CDMA) has been extensively used in such applications as satellite and cellular communications. CDMA signals increase the spectrum required for the transmission of a particular data rate by modulating each information symbol with a spread spectrum code having a rate larger than the data rate. The same spreading code is used for each information symbol. Typically, the spreading code comprises a few tens or a few hundreds of elements, called chips. To decrease the correlations among spreading codes assigned to different users, and thereby reduce the interference among different users, the data stream after spreading is typically scrambled with a pseudo-noise (PN) code that is generated serially and cyclically and has a larger period than the spreading code. Examples of such CDMA signal spreading are the schemes used by the IS-95/CDMA2000 and 3GPP systems. With CDMA, the signals from all users simultaneously occupy the same frequency band. The receiver discriminates the multiple signals by exploiting the properties of the spreading and scrambling codes that are applied to the signal of each user. The receiver attempts to match in time the codes of the desired signal with a replica of those spreading and scrambling codes. Only then is the demodulation result meaningful; otherwise it appears noise-like. Thus, if the arriving signals have different codes or different code offsets, they can be discriminated at the receiver.

In the forward link (downlink) of cellular communication systems (the communications from base stations to mobile terminals) the wireless channel may introduce multipath propagation. Even if the signals transmitted by the base station are spread using orthogonal codes (Walsh codes), the multipath propagation will destroy the orthogonality and produce multiple-access interference (MAI). That is, a code may not be orthogonal to a delayed version of another code. Interference cancellation (IC) attempts to suppress the MAI by estimating and subtracting the interference from the received signal. Because the capacity of CDMA systems is MAI-limited, estimating and canceling the MAI will increase the capacity. Alternatively, IC can reduce the signal-to-noise ratio (SNR) required to achieve a specific symbol-error-rate (SER) or frame-error-rate (FER) value for a specific number of users, thereby increasing mobile terminal battery life and decreasing transmission power. The implementation alternatives for IC are the parallel IC (PIC) and the serial IC (SIC). With PIC, all users are simultaneously demodulated, a tentative decision is made for their information symbols, the MAI is regenerated and the process is iterated a number of times until all significant improvements in the SER performance are achieved. With SIC, a similar process is performed with the exception that a decision on the stronger user is first made, the interference from that user on the decision statistic of the next stronger user is subsequently removed and a decision for the next stronger user is made, etc. The main advantage of SIC relative to PIC is that the decisions for the stronger users are more reliable than the decisions for the weaker ones and therefore, the MAI removal of the stronger users is reliable and this benefits the weaker users. The main disadvantage of SIC relative to PIC is the decision delay associated with SIC because of its serial nature and the architecturally difficult reordering of the detection process each time the relative signal strengths change. There are also several modifications that can be applied to the IC process. For example, the decisions made at each IC stage can be hard or soft, clipped or threshold-based or unmodified, the estimated IC can be weighted to account for the bias that exists in the decisions depending on the IC stage and for the reliability of the individual decisions depending on the signal strength.

SUMMARY OF THE INVENTION

The present invention provides a method and a receiver (user) to suppress multiple access interference (MAI) from signals assigned to the user of interest and from signals assigned to other users that may not be known to the user of interest. It provides a method to identify the codes used by signals that are not assigned to the user of interest and a method to cancel their composite interference from the received signal.

BRIEF DESCRIPTION OF THE DRAWINGS

The drawings are heuristic for clarity.

DETAILED DESCRIPTION OF THE PREFERRED EMBODIMENTS

1. Overview

Figure 1A:
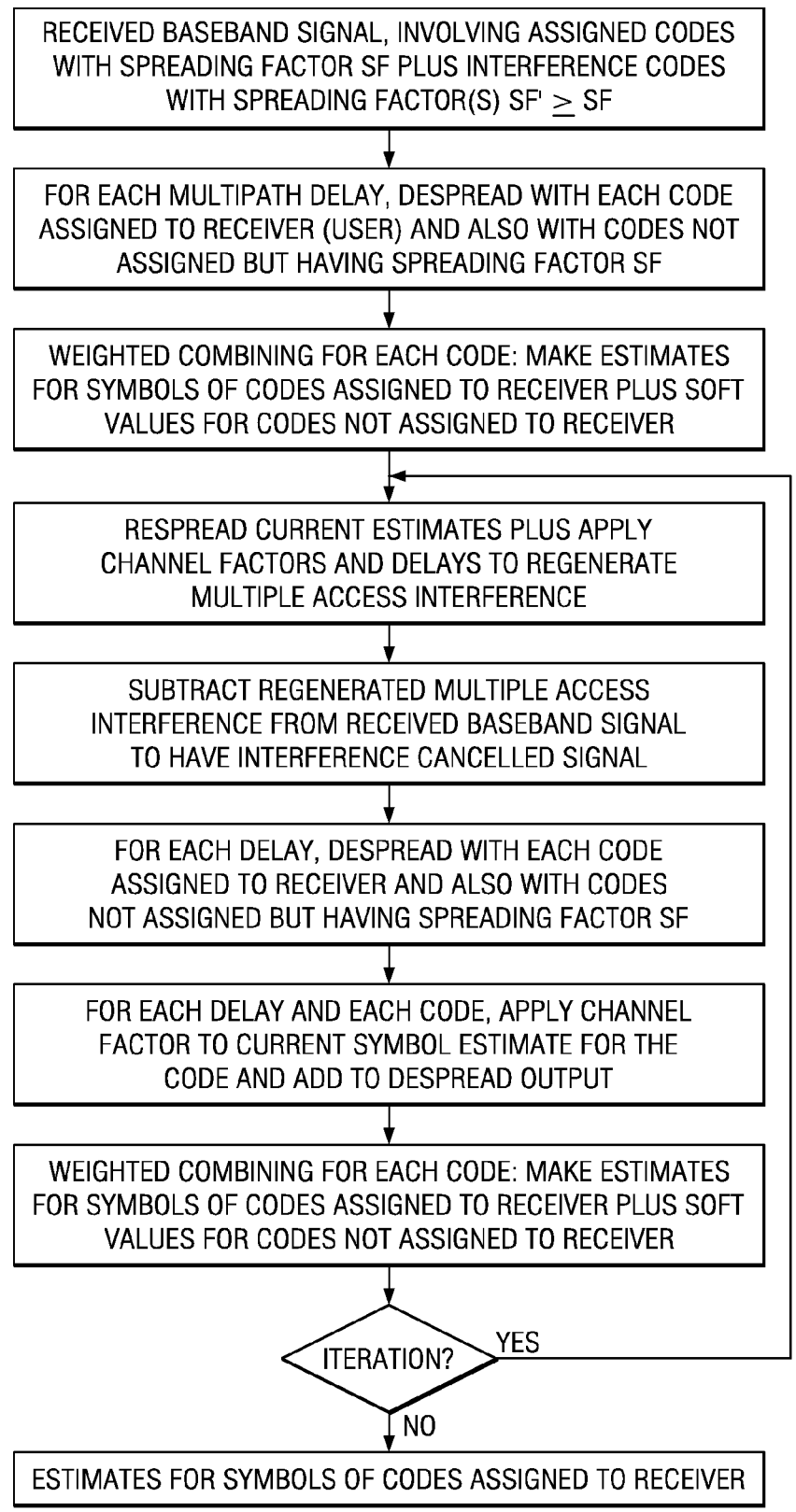
FIGS. 1a–1b are flow diagrams for preferred embodiment interference cancellations.
Figure 1B:
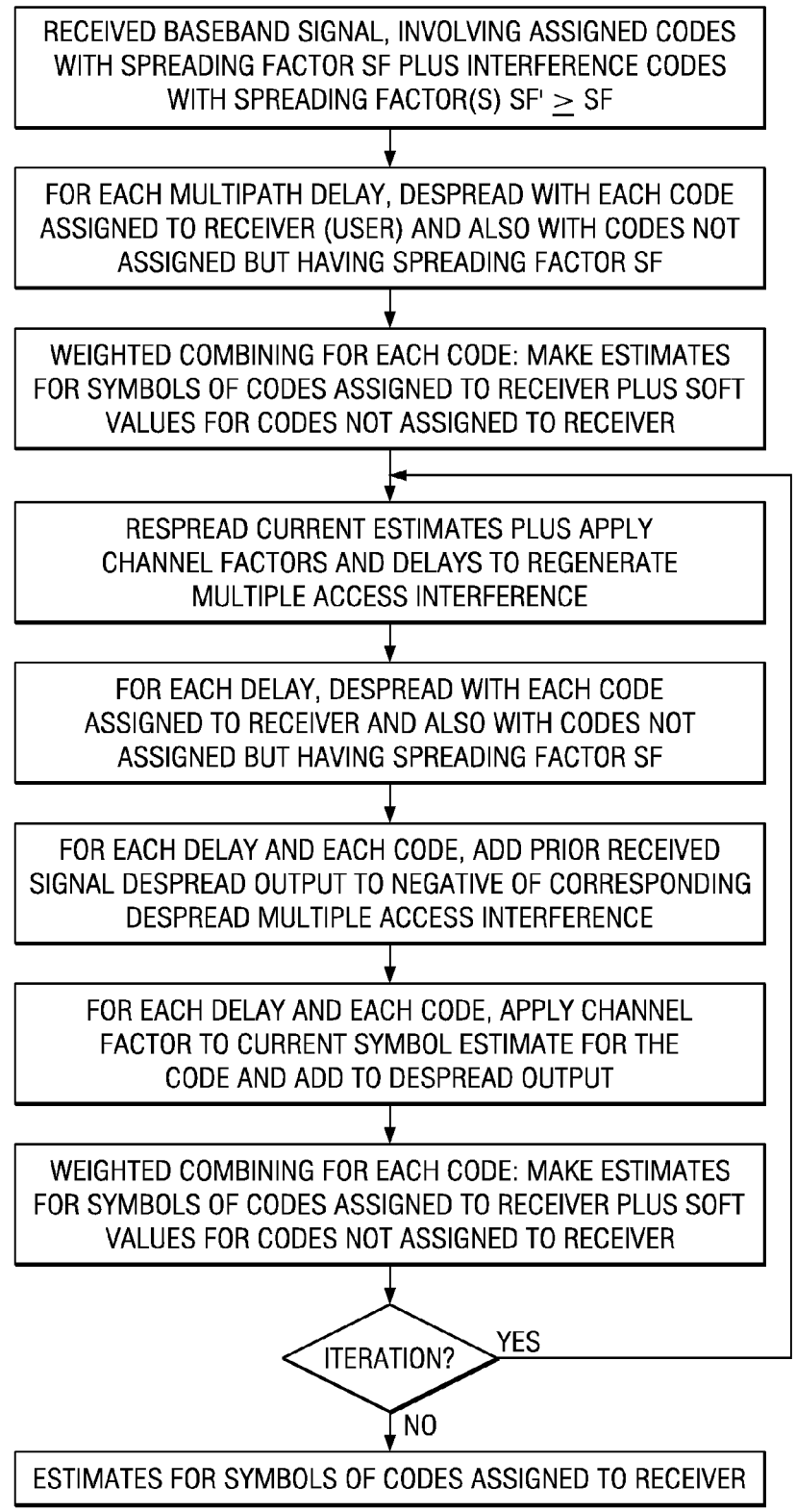
Figure 7:
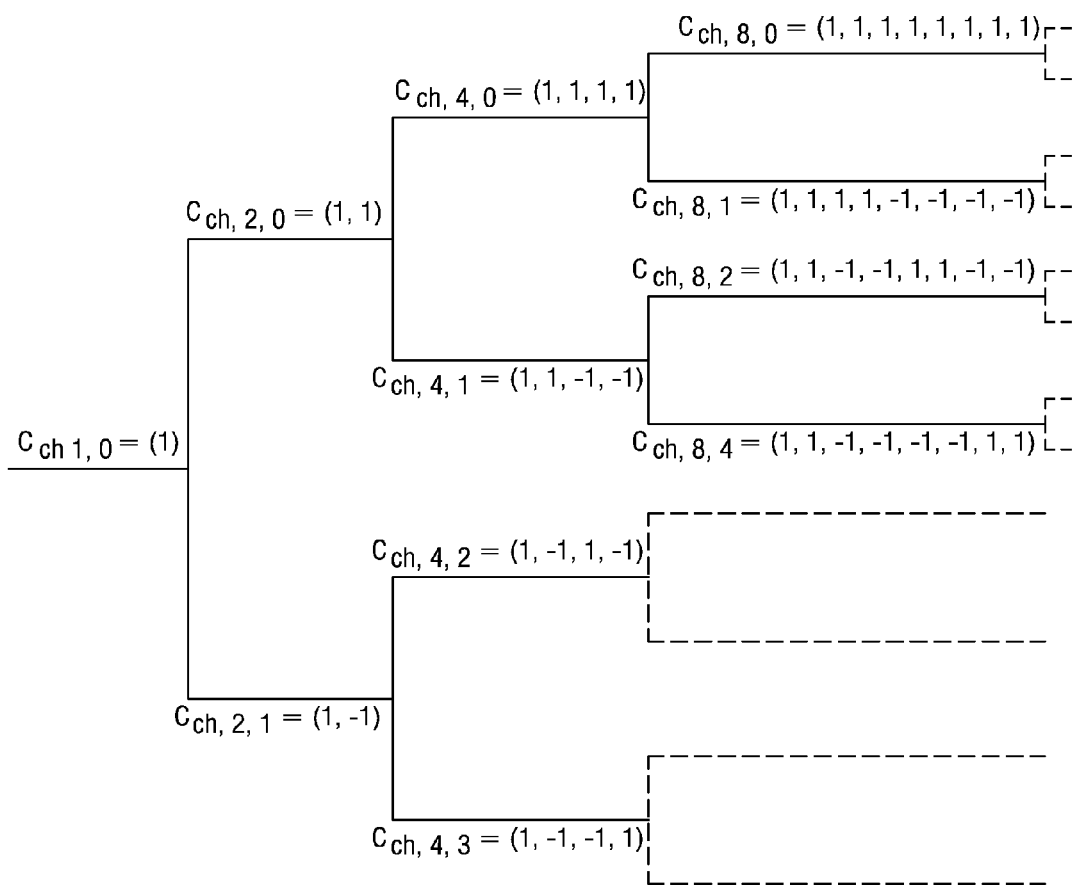
FIG. 7 shows an orthogonal code tree.

FIGS. 1a–1b are flow diagrams for preferred embodiment interference cancellation methods for a user; the methods detect fixed spreading factor codes (both assigned and not assigned to the user) to cancel multiple access interference (MAI) of other users including those with same or higher spreading factor codes in the code tree (see FIG. 7). For the interference arising from same or higher spreading factor codes, the regenerated multiple access interference may use soft values since the power of the corresponding signals is assumed to be unknown to the user/receiver of interest.

Figure 2:
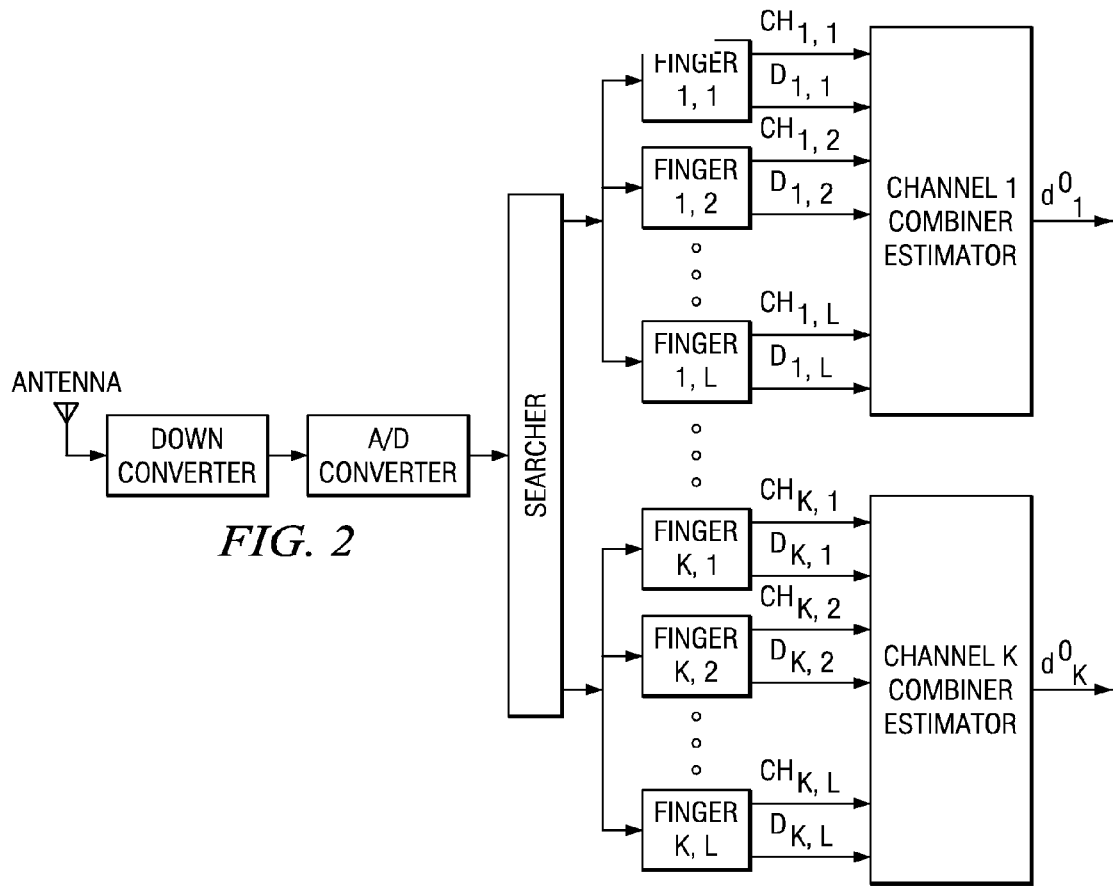
FIG. 2 is a functional block diagram showing the detector, searcher, fingers, and K channel combiner-estimators with L codes each of a preferred embodiment receiver.
Figure 3:
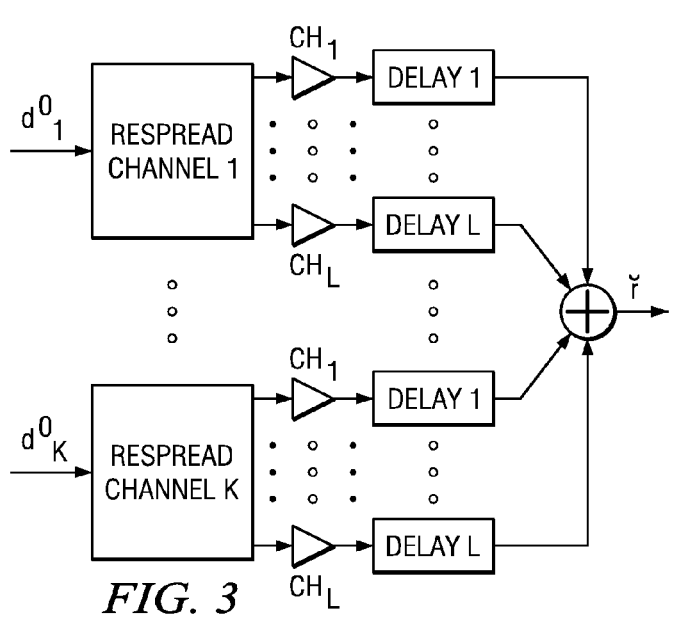
FIG. 3 is a functional block diagram of the multiple access interference regenerator for K channels with L codes each of a preferred embodiment.
Figure 4:
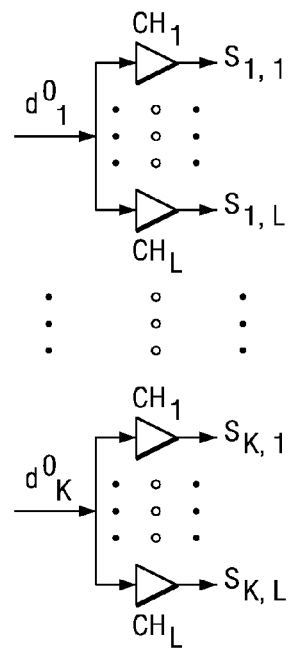
FIG. 4 is a functional block diagram of the desired despread signal regenerator for K channels with L codes each of a preferred embodiment.
Figure 5:
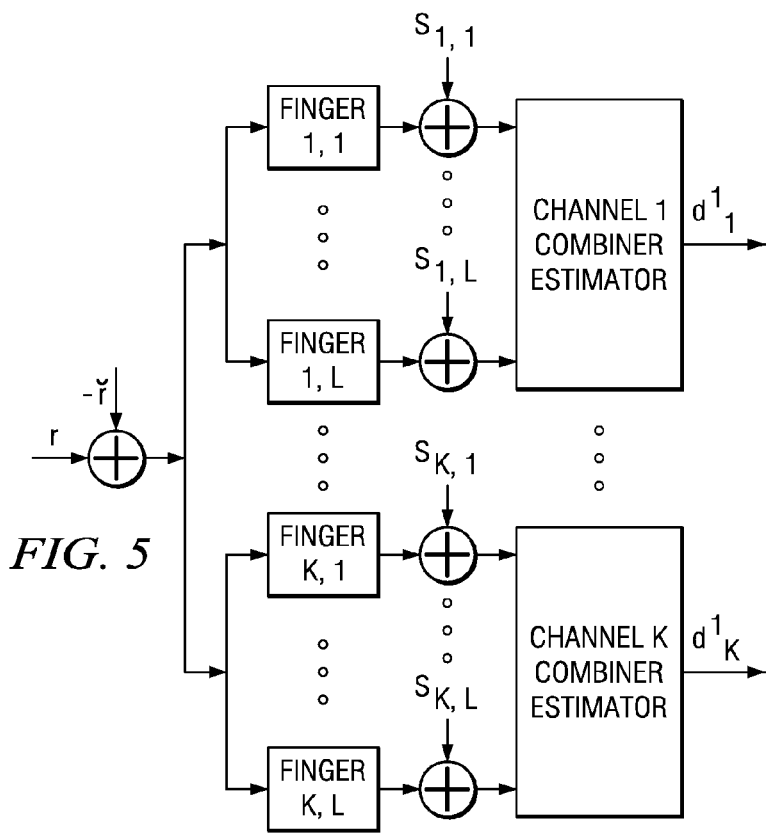
FIG. 5 is a functional block diagram of the interference cancellation for K channels with L codes each of a first preferred embodiment.
Figure 6:
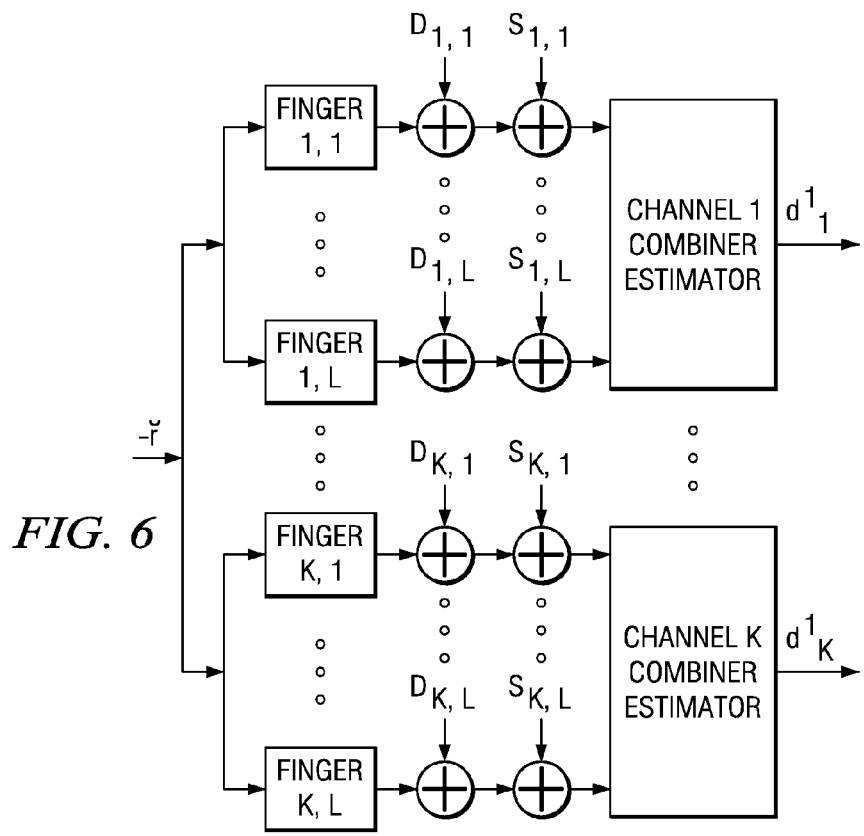
FIG. 6 is a functional block diagram of the interference cancellation for K channels with L codes each of a second preferred embodiment.

FIGS. 2–6 show functional blocks of preferred embodiment receivers. FIG. 2 illustrates a generic receiver for K codes with L multipaths for each code; the $CH_{i,j}$ are channel coefficient factor estimates and the $D_{i,j}$ are the despread and synchronized outputs; for the downlink the channel coefficients for a given multipath (delay) are the same for each code. That is, tracking and despreading finger 1,j, finger 2,j, . . . , and finger K,j may all physically be the same multipath tracking unit and just reflect different code correlations. The combining may be weighted by SNR of the multipath. FIG. 3 shows regeneration of the received multiple access interference signal using the initial estimates of the receiver of FIG. 2, and FIG. 4 shows regeneration of the despread signals using these estimates from the receiver. FIG. 5 illustrates a first interference canceller which subtracts the regenerated multiple access interference signal from the received signal plus adds the appropriate regenerated despread signal followed by weighted combining for updated symbol estimates/decisions. FIG. 6 illustrates an alternative second interference canceller which differs from the FIG. 5 first interference canceller by directly using the prior despreading results $D_{i,j}$ (see FIG. 2) rather than again despreading the received signal; that is, in FIG. 5 the difference $r-\check{r}$ is despread, in FIG. 6 only $-\check{r}$ is despread. The preferred embodiment methods provide iterative cancellation improvement by using the estimates output of FIG. 5 for the next iteration inputs of FIGS. 3–4. FIGS. 1a–1b illustrate the flows for interference cancellers of FIGS. 5 and 6, respectively.

Preferred embodiment communication systems, such as cellular spread spectrum systems, include preferred embodiment interference receivers employing preferred embodiment interference cancellation methods. The computations can be performed with digital signal processors (DSPs) or general-purpose programmable processors or application specific circuitry (ASICs) or systems on a chip such as both a DSP, ASIC, and RISC processor on the same chip with the RISC processor controlling. Analog-to-digital converters and digital-to-analog converters provide coupling to the real world, and modulators and demodulators (plus antennas for air interfaces) provide coupling for transmission waveforms.

2. HSDPA Preferred Embodiments

FIGS. 2–6 show in block form first and second preferred embodiment mobile receivers (user equipment UE) of a code division multiple access (CDMA) communication system with K channels to users and L multipaths per channel signal; K and L may vary. A single user may occupy multiple channels and the channels may be code multiplexed as in the high-speed downlink packet access (HSDPA) format of 3GPP or the 1xEVDV format of 3GPP2. These formats will provide an illustration; however, the receiver architecture and method of operation also extend to any other CDMA system employing orthogonal spreading in the forward (down) link. In HSDPA, the UE is assigned a number of multicodes with spreading factor (SF) of 16; that is, a single UE may receive transmissions on multiple codes simultaneously. The number of these multicodes may be comparable with the total number of orthogonal codes for the corresponding SF; therefore, the UE should have the capability of despreading nearly all codes for the corresponding SF even though only a fraction of these codes may be used during a particular transmission to the referenced UE. The consequence of this design requirement is that there is no inherent complexity increase in a UE receiver despreading all orthogonal codes with the same spreading factor as that of its assigned multicodes (SF=16 in HSDPA). Despreading may be performed, for example, using the Fast Hadamard Transform (FHT).

The existence of multipath propagation destroys the orthogonality in the forward link and performance is limited by multiple-access interference (MAI) experiencing an error floor. This error floor is particularly severe for amplitude modulations, such as 16-QAM and 64-QAM, that are associated with high data rate transmissions. Conventional interference cancellation (IC) suppresses the interference by despreading each signal, making a decision for the value of the corresponding information bit, using the knowledge of the scrambling and spreading codes and a channel estimate to regenerate the corresponding received signal component, and subtracting it from the received signal. In HSDPA this approach may consider the multicodes corresponding to the UE as the known interferers and perform IC according to any of many known techniques. This may produce acceptable results if the HSDPA signal has most of the total transmitted power. However, HSDPA users coexist with other 3GPP users that typically require voice service and use orthogonal codes with spreading factors larger than 16. These 3GPP users may be allocated a significant portion of the total transmitted power. This is particularly accentuated by the fact that voice users tend to be further away from the base station and experience a worse channel medium than HSDPA users. The HSDPA UE does not know either the spreading codes or the powers of these 3GPP signals and cannot therefore estimate each individual signal and perform IC according to any known method. Moreover, such a functionality would require a prohibitive increase in the complexity of the UE receivers. As a consequence, the performance may not improve adequately if IC is performed only for the known multicodes of the HSDPA UE and the error floor may be as severe as the one experienced by the conventional RAKE receiver without performing any IC. Therefore, conventional IC methods do not provide a satisfactory solution to the interference problem for HSDPA applications and cannot extend the use of spectrally efficient modulations (16-QAM, 64-QAM) to multipath environments with non-negligible intracell interference.

The first preferred embodiments circumvent the previous drawback of conventional IC methods by realizing that 3GPP users coexisting with HSDPA users typically employ orthogonal codes with SFs larger than the SF used by the multicodes for HSDPA transmission. In particular, let S denote the set of orthogonal codes with the SF employed by HSDPA, $S_H$ denote the subset of codes in S used by HSDPA, and by $\hat{S}_H$ the remaining codes in S (i.e., $S=S_H \cup \hat{S}_H$). Since the HSDPA transmission may use nearly all codes in S (with the exception of the codes being roots in the code tree of common forward link channels such as the pilot channel CPICH), the HSDPA UE receiver is capable to despread all codes in S. Therefore, despreading with all codes in S does not add to the complexity of the HSDPA UE. The HSDPA UE knows of the codes in $S_H$, because they comprise its assigned multicodes, and can therefore deduce the codes in $\hat{S}_H$.

The first preferred embodiment IC methods include despreading with the codes in $\hat{S}_H$ and subsequent (weighted) multipath combining or any other detection approach. An individual decision (e.g., hard, soft, clipped, thresholded, etc.) can be made for the information bit corresponding to each code in $S_H$. Then, using knowledge of the corresponding scrambling and spreading codes and a channel estimate obtained, for example, using the pilot signal, each multicode signal can be regenerated and subtracted from the received signal. The preferred embodiment methods also perform despreading and combining for all codes in $\hat{S}_H$ (except possibly for the all-zero code which is only used by the common pilot signal which can be readily removed from the received signal for the detection of the information bearing signal components). These codes in $\hat{S}_H$ may or may not be root codes of the codes used by the remaining interferers. The ones that are comprise the building block of the spreading codes used by those interferers. The spreading codes used by interferers are generated as concatenations of the root code in $\hat{S}_H$ and its opposite. As a consequence, the combined interference of signals having spreading codes partly comprising any code in $\hat{S}_H$ can be quantified with respect to that code. Since the spreading codes of all interfering signals partly comprise a code in $\hat{S}_H$, all interference can be quantified based on codes in $\hat{S}_H$. This interference can then be removed by spreading the soft despread value for each code in $\hat{S}_H$ with that same code and subtracting the result from the received signal. No knowledge of the individual spreading codes, the individual information symbols, or the (relative) power of the interferers is needed. This is because the interference the signals assigned to the user of interest experience after despreading from signals assigned to other users can be fully quantified by the code in $\hat{S}_H$ serving as the root code. More than one signals assigned to other users may have the same root code in $\hat{S}_H$ and more than one codes in $\hat{S}_H$ may be the root code to codes used by other users. All that the receiver of the user of interest needs to know is the total interference corresponding to a code in $\hat{S}_H$ and not the individual interference created by signals having that particular code in $\hat{S}_H$ as their root code. For the same reasons, the receiver of interest does not need to estimate the individual information symbols of the signals assigned to other users; only a soft decision value for the aggregate signal using a code in $\hat{S}_H$ is needed.

Not all codes in $\hat{S}_H$ are necessarily used by interfering signals. Therefore, respreading and subtracting from the received signal the despreading result for any code in $\hat{S}_H$ may not result in interference suppression but in noise enhancement. This can be avoided by comparing the value of the despread output with the noise value after despreading. The second may be easily obtained, for example based on the common pilot, and is also used by other receiver functions such as signal-to-noise ratio estimation. Measuring the despread signal value for each possible code in $\hat{S}_H$ over a sufficient number of symbol periods can indicate with practically perfect accuracy the codes in $\hat{S}_H$ that form the roots of codes used by signals assigned to other users.

In addition to despreading the received signal at identified multipath instances, typically being more than a chip period apart, the received signal may also be despread at time instances separated by less than a chip period. Actual multipaths separated by less than a chip period are difficult to identify. Such multipaths may occur in urban environments for low mobility UEs and in indoor environments. In these situations, a conventional path searcher will typically identify a second path separated by one chip period from the first path (the searcher may also identify paths separated by less than a chip period but there is always significant energy from the same path at time instances less than one chip period from the time of that path). When this occurs, despreading may also be performed at a time instant between the two identified arrival times. If a second path does indeed exist at a subchip location from the first path, the performance benefits can be significant. Otherwise, the performance may incur a penalty that is however much smaller than the potential gain. The previously described IC method may also be applied in this context 3. Example An explicit example of the foregoing preferred embodiment may help understanding. In particular, let the spreading factor be 16, the user assigned multicodes are 10 of these 16 codes, 16-QAM modulation, and presume 2 multipaths. Thus take code $C_{ch,16,0}$ for the common pilot channel CPICH (the CPICH typically has the code $C_{ch,256,0}$ comprising a concatenation of 16 copies of the code $C_{ch,16,0}$ and has a sequence of +1s as the corresponding information symbols), codes $C_{ch,16,1}$, $C_{ch,16,2}$, . . . , $C_{ch,16,10}$, as the desired user codes, and presume two other low-data-rate interfering users with spreading factor 64, QPSK modulation, and using codes $C_{ch,64,44}$ and $C_{ch,64,45}$; these two codes have a common spreading factor 16 root code $C_{ch,16,11}$. Thus, with the second multipath having delay of $\tau$ relative to the first multipath and corresponding channel coefficients (factors) $\alpha_1$ and $\alpha_2$ (denoted $CH_x$ in the Figures) for the first and second multipaths, respectively ($\alpha_1$, $\alpha_2$, and $\tau$ all varying slowly compared to the symbol rate), the received baseband signal can be represented as follows where the index m labels the symbols transmitted to the user (so the symbols, $d_{44}$ and $d_{45}$, transmitted to the two interfering users at a spreading factor 4 times as large only change when m is a multiple of 4):

$$r(t) = \sum_m \left\{ \sum_{0 \leq k \leq 10} d_k(m) [\alpha_1 c_k(t-mT) + \alpha_2 c_k(t-mT-\tau)] + \right.$$
$$d_{44}(m)[\alpha_1 c'_{44,m\%4}(t-mT) + \alpha_2 c'_{44,m\%4}(t-mT-\tau)] +$$
$$\left. d_{45}(m)[\alpha_1 c'_{45,m\%4}(t-mT) + \alpha_2 c'_{45,m\%4}(t-mT-\tau)] \right\} + \text{noise}(t)$$

The sum over k corresponds to the pilot channel plus 10 multicodes of the user and the other two terms are for the two interfering users. T denotes the 16-chip time interval of a symbol for the user, $c_k(\ )$ denotes the modulation pulse sequence of length 16 chips with ±amplitudes corresponding to the ±1s of the product of the cell's scrambling code and code $C_{ch,16,k}$ and equals 0 outside of a symbol interval [0,T]. Thus the information transmitted to the user in the mth symbol interval is the set of 10 symbols $d_1(m)$, $d_2(m)$, . . . , $d_{10}(m)$; and the pilot symbol transmitted is $d_0(m)$. Analogously, $c'_{44,m\%4}(\ )$, with m % 4 meaning m modulo 4, denotes a quarter of the modulation pulse sequence of length 64 corresponding to the product of the cell's scrambling code and code $C_{ch,64,44}$; and likewise $c'_{45,m\%4}(\ )$ for code $C_{ch,64,45}$. That is, in the four consecutive 16-chip intervals m=4n, 4n+1, 4n+2, and 4n+3, $c'_{44,0}(t-mT)$ is the first, $c'_{44,1}(t-mT)$ is the second, $c'_{44,2}(t-mT)$ is the third, and $c'_{44,3}(t-mT)$ is the fourth 16-chip portion of the modulation pulse sequence of length 64 corresponding to $C_{ch,64,44}$. The corresponding symbols $d_{44}(m)$ and $d_{45}(m)$ are constant over these four consecutive 16-chip intervals and equal the symbol for the 64-chip interval of the first and second of the two interfering users, respectively.

The preferred embodiment method takes advantage of the code tree structure: $C_{ch,64,44}$ and $C_{ch,64,45}$ both are concatenations of length four of $\pm C_{ch,16,11}$. This allows the two interfering users to be interpreted as a single code $C_{ch,16,1}$ interfering user, but with a non-standard "symbol" $d_{11}(m)$. Thus the user can make soft estimates of this "$C_{ch,16,11}$" interfering user and provide interference cancellation. More explicitly, $C_{ch,64,44}=C_{ch,16,11}$, $C_{ch,16,11}$, $C_{ch,16,11}$, $C_{ch,16,11}$, and $C_{ch,64,45}=C_{ch,16,11}, C_{ch,16,11},-C_{ch,16,11},-C_{ch,16,11}$. Thus the received baseband signal, after descrambling, can be written $$r(t)=\Sigma_m\{\Sigma_{0\le k\le 11}d_k(m)[\alpha_1 c_k(t-mT)+\alpha_2 c_k(t-mT-\tau)]\}+\text{noise}(t)$$

where in the simple case of the interfering users having the same power level $d_{11}(m)=d_{44}(m)+d_{45}(m)$ for m % 4=0, 1 and $d_{11}(m)=d_{44}(m)-d_{45}(m)$ for m % 4=2,3. With $d_{44}(m)$ and $d_{45}(m)$ both QPSK symbols, $d_{11}(m)$ has 9 possible values: real part and imaginary part each have three possible values −2,0,−2. Note that codes $C_{ch,16,1}, \ldots, C_{ch,16,10}$ are elements of $S_H$ whereas code $C_{ch,16,11}$ is an element of $\hat{S}_H$.

The preferred embodiment detection and interference canceling provides a tracking and despreading finger for each combination of multipath (delay) and code $C_{ch,16,0}$, $C_{ch,16,1}, \ldots, C_{ch,16,15}$ but when only noise is found for any of the not-assigned codes $C_{ch,16,11}, \ldots, C_{ch,16,15}$ the corresponding branch codes may be deemed not used and ignored as there is not any transmitted signal having that code as its root code. The output finger 1,1 (code $C_{ch,16,1}$ and first multipath) for the $m^{th}$ symbol interval heuristically is:

$$\int r(t)c_1(t-mT)dt = \alpha_1 d_1(m) + \sum_{0\le k\le 11} d_k(m)\alpha_2 \int c_k(t-mT-\tau)c_1(t-mT)dt +$$
$$\int \text{noise}(t)c_1(t-mT)dt$$
$$= y_{1,1}(m)$$

where the integrals strictly should be sums over the digitized symbol interval and the prior delayed (second multipath) symbol overlap has been ignored. The sum represents the interference; the orthogonality of the codes eliminated the other first multipath terms.

The analogous expression for the output of finger 1,2 (code $C_{ch,16,1}$ and second multipath) is:

$$\int r(t)c_1(t-mT-\tau)dt = \alpha_2 d_1(m) + \sum_{0\le k\le 11} d_k(m)\alpha_1 \int c_k(t-mT)c_1(t-mT-\tau)dt +$$
$$\int \text{noise}(t)c_1(t-mT-\tau)dt$$
$$= y_{1,2}(m)$$

Then the combining uses estimates for the channel coefficients $\alpha_1$ and $\alpha_2$ (estimates may come from the pilot symbols with code $C_{ch,16,0}$) and yields the decision statistic for the symbol $d_1(m)$:

$$z_1(m)=(\alpha^*_1 y_{1,1}+\alpha^*_2 y_{1,2})/(|\alpha_1|^2+|\alpha_2|^2)$$

Thus derive the 0th iteration symbol estimate $d_1^0(m)$ from $z_1(m)$. The decision could be a hard decision based on distance within the 16-QAM symbol constellation or a soft decision.

Proceed likewise for the other fingers for symbols $d_2(m), \ldots, d_{10}(m)$ transmitted to the user plus the higher spreading factor "symbol" $d_{11}(m)$ transmitted to the interfering users, although a hard decision cannot be used because generally $d_{11}(m)$ has an unknown "power". Indeed, for the multiple access interference, simply take the 0th iteration $d_{11}^0(m)=z_{11}(m)$. Alternatively, $z_{11}(m)$ could be clipped and/or thresholded plus could be weighted relative to the other $z_j(m)$. The pilot symbol, $d_0(m)$ is known and used to estimate the channel coefficients.

Then, ignoring the scrambling code for notational simplicity, use these 0th iteration estimates $d^0_k(m)$ as inputs for the regenerations of FIGS. 3 and 4:

$$\hat{r}(t)=\Sigma_m\{\Sigma_{0\le k\le 11}d^0_k(m)[\alpha_1 c_k(t-mT)+\alpha_2 c_k(t-mT-\tau)]\}$$

$$S_{k,1}=d^0_k(m)\alpha_1$$

$$S_{k,2}=d^0_k(m)\alpha_2$$

Use these regenerations as inputs for interference cancellation estimation as in FIG. 5 or 6 to obtain the interference cancelled 1st iteration estimates $d^1_k(m)$.

For a second iteration, use the 1st iteration estimates $d^1_k(m)$ as inputs for the regenerations (FIGS. 3 and 4 with $d^1_k(m)$ inputs in place of $d^0_k(m)$ inputs) and the resultant regenerations ($\hat{r}(t)$ and $S_{k,i}$) then as inputs for the interference cancellation (FIG. 5 or 6) to obtain the 2nd iteration estimates, $d^2_k(m)$.

Similarly, further iterations use the current estimates as inputs for regeneration and subsequent interference cancellation. A set number of iterations, such as 4, can be implemented, and the estimates can then be input to a decoder (for soft estimates, a Viterbi/Turbo decoder).

Of course, the foregoing example could be extended to interfering users at differing power levels, to more or fewer interfering users with higher spreading factors, to additional same spreading factor root codes, to root codes generating one or more codes used by interfering signals, and to interfering users with a same spreading factor. However, none of the above affects the implementation of the methods. The methods effectively identify which of the codes of the same spreading factor as the codes assigned to the receiver of interest are root codes to one or more codes assigned to interfering users and use these code(s), in addition to the codes assigned to the receiver of interest, to perform IC. Soft decisions can be used for estimates from the root codes associated with the interfering signals of higher spreading factors. Of course, the base station could simply transmit information about other users and assigned (root) codes; this would moot the need for identification of interfering users and simplify the selection of root codes for despreading and IC.

4. Modifications

The preferred embodiments may be modified in various ways while retaining the features of identifying root codes used by codes of interfering users and despreading with root codes for higher spreading factor codes estimations.

For example, differing modulations, differing code trees, root code (the codes with same spreading factor as the spreading codes assigned to the user) spreading factors other than 16, an so forth.

What is claimed is:

1. A method of reception, comprising:
   (a) despreading a received signal with a first spreading code associated with a first user;
   (b) making first estimates from the results of step (a);
   (c) despreading said received signal with a second spreading code, said second spreading code with a spreading factor equal to spreading factor of said first spreading code, said second spreading code a root of a third spreading code, said third spreading code with spreading factor larger than or equal to said spreading factor of said first spreading code, said third spreading code associated with a second user;

(d) making second estimates from the results of step (c);
(e) performing interference cancellation using said first and second estimates.

2. The method of claim 1, wherein:
(a) said making estimates of step (d) of claim 1 uses soft decisions.

3. The method of claim 1, wherein:
(a) said making estimates of step (d) of claim 1 uses clipped decisions.

4. The method of claim 1, wherein:
(a) said interference cancellation of step (e) of claim 1 is serial interference cancellation.

5. The method of claim 1, wherein:
(a) said interference cancellation of step (e) of claim 1 is parallel interference cancellation.

6. The method of claim 1, wherein:
(a) said interference cancellation of step (e) of claim 1 uses different weightings for said estimates of step (b) and said estimates of step (d).

7. The method of claim 1, wherein:
(a) said received signal is detected with two or more fingers, each of said fingers tracking a multipath and despreading with at least one spreading code.

8. The method of claim 7, wherein:
(a) said detecting uses at least two fingers with a delay between fingers resolvable to less than one chip period.

9. The method of claim 1, wherein:
(a) said received signal includes CDMA encoding.

10. The method of claim 1, wherein:
(a) said received signal includes CDMA encoding with codes from an orthogonal code tree.

11. The method of claim 1, wherein:
(a) said spreading factor of said first spreading code equals a power of 2.

12. The method of claim 1, wherein:
(a) said spreading factor of said first spreading code equals 16.

13. The method of claim 1, wherein:
(a) said despreading of step (a) of claim 1 uses a fast Hadamard transform.

14. The method of claim 1, wherein:
(a) said despreading of step (c) of claim 1 uses a fast Hadamard transform.

15. The method of claim 1, wherein:
(a) said first spreading code is one of a first plurality of spreading codes assigned to said first user where each spreading code of said first plurality of spreading codes has spreading factor equal to spreading factor of said first spreading code;
(b) said third spreading code is one of a second plurality of spreading codes assigned to a plurality of users, said plurality of users including said second user and where each spreading code of said second plurality of spreading codes has spreading factor equal to or greater than spreading factor of said first spreading code; and
(c) said performing interference cancellation of step (e) of claim 1 also using results of estimating using despreadings using said first plurality of spreading codes and despreadings using at least one root code of said second plurality of spreading codes where said at least one root code has spreading factor equal said spreading factor of said first spreading code.

16. The method of claim 1, wherein:
(a) said performing interference cancellation includes reconstructing an approximate interference signal using results said estimating of steps (b) and (d) of claim 1 and iterating said steps (a)–(d) of claim 1 with said received signal replaced with said received signal having said approximate interference signal removed.

17. A method of interference cancellation, comprising:
(a) despreading a received signal using a first spreading code $C_1$, $C_1$ is assigned to a first user and has spreading factor equal to positive integer N;
(b) despreading said received signal using a second spreading code $C_2$, $C_2$ has a spreading factor equal to said N and is a root of a spreading code $C_X$, where $C_X$ is a spreading code of spreading factor greater than said N and $C_x$ is assigned to a second user;
(c) estimating from results of said despreading of step (a);
(d) estimating from results of said despreading of step (b); and
(e) performing interference cancellation from results of steps (c) and (d).

18. The method of claim 17, wherein:
(a) said performing interference cancellation of step (e) of claim 17 includes using the results of step (d) of claim 17 in deciding when said $C_2$ is a root of a spreading code $C_X$ assigned to said second user.

19. A receiver, comprising:
(a) a first despreader coupled to a received signal input, said first despreader using a first spreading code with a first spreading factor;
(b) a first estimator coupled to the output of said first despreader;
(c) a second despreader coupled to said input, said second despreader using a second spreading code, said second spreading code with second spreading factor equal to said first spreading factor, said second spreading code a root of a third spreading code with third spreading factor greater than said first spreading factor;
(d) a second estimator coupled to the output of said second despreader;
(e) a regenerator with inputs coupled to outputs of said first and second estimators;
(f) an interference canceller with inputs coupled to outputs of said regenerator;
(g) whereby when said first spreading code is assigned to a first user and said third spreading code is assigned to a second user, said interference canceller cancels multiple access interference associated with said second user.

20. The receiver of claim 19, wherein:
(a) said regenerator includes an interference regenerator with first and second respreaders, and output coupled to a first input of said interference canceller;
(b) said regenerator includes despread regenerators with outputs coupled to second inputs of said interference canceller;
(c) said interference canceller has outputs coupled to inputs of said interference regenerator and to inputs of said despread regenerators;
(d) whereby iterative interference cancellation is performed.

21. The receiver of claim 20, wherein:
(a) said interference canceller includes third and fourth despreaders coupled to said interference regenerator output; and
(b) said interference canceller includes third and fourth estimators with inputs coupled to said outputs of said despread regenerators and to said third and fourth despreaders.

22. The receiver of claim 21, wherein:
(a) said third and fourth estimators with inputs coupled to outputs of said first and second despreaders.

23. The receiver of claim 21, wherein:
(a) said third and fourth despreader inputs are coupled to said received signal input.

* * * * *